Nov. 10, 1959     R. W. WAYMAN     2,911,987
HYDRAULIC GOVERNOR
Original Filed Feb. 12, 1951
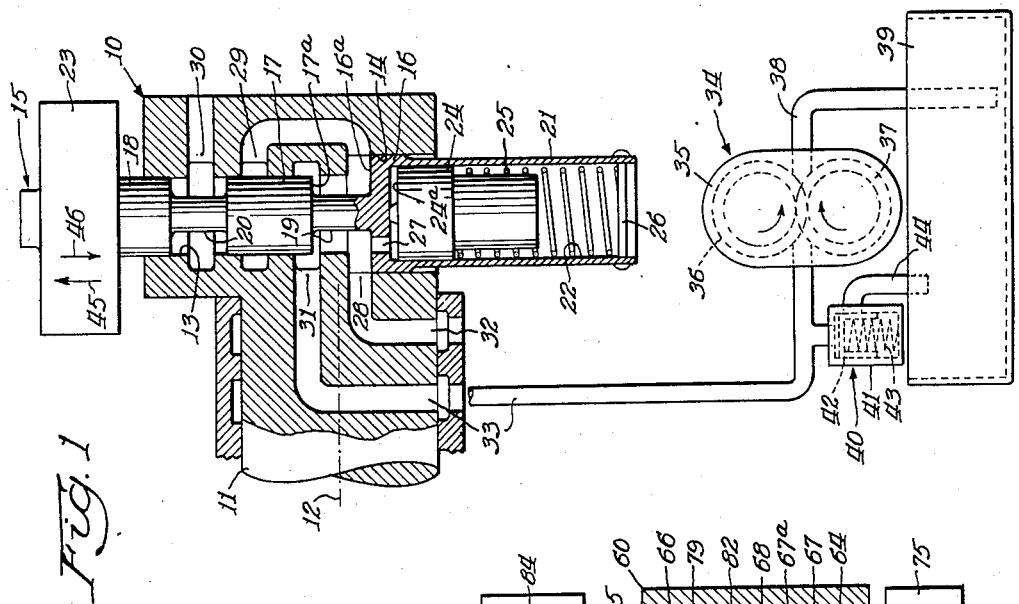
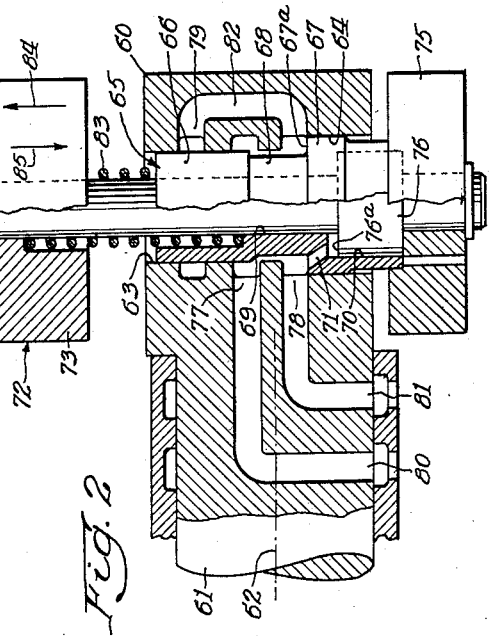
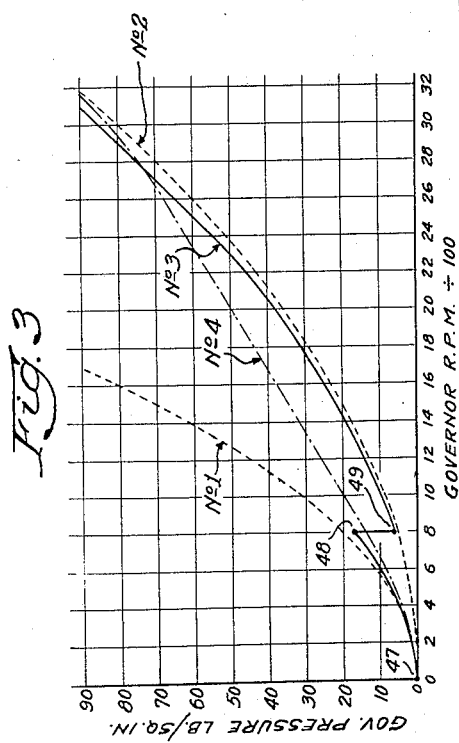
Inventor:
Robert W. Wayman United States Patent Office 2,911,987
Patented Nov. 10, 1959

2,911,987

HYDRAULIC GOVERNOR

Robert W. Wayman, Muncie, Ind., assignor to Borg-Warner Corporation, Chicago, Ill., a corporation of Illinois Continuation of abandoned application Serial No. 210,549, February 12, 1951. This application March 26, 1953, Serial No. 344,709

36 Claims. (Cl. 137—51)

My invention relates to hydraulic governors and more particularly to such governors particularly useful in connection with automobile transmissions.

This application is a continuation of Wayman, Serial No. 210,549, filed February 12, 1951, now abandoned, and entitled "Hydraulic Governor."

Governors of this general type have been proposed and used in the past for the purpose of providing fluid pressures that increase with increases in vehicle speed, these fluid pressures being impressed on automatic ratio changing shift valves in automatic transmissions for causing shifting of the valves and resultant changing in speed ratio through the transmissions when the vehicles reach predetermined speeds. These prior governors have, however, had a restricted range, that is, if they are so arranged as to provide substantial increases in fluid pressure for increases in vehicle speed at relatively low vehicle speeds, the maximum pressure of the governors is reached at a relatively low vehicle speed, so that the same governor cannot be used for a shift valve arranged to shift at a substantially higher vehicle speed, while, if the governors are arranged to provide an appreciable increase in fluid pressure with increase in governor speed at relatively high speeds of the governor for acting on a valve arranged to shift at relatively high vehicle speeds, the governors in this case provide an inappreciable increase in output pressure at relatively low speeds of the governor and are not suitable for shifting a shift valve arranged to shift at relatively low vehicle speeds. For this reason, in transmissions in which a number of such ratio changing shift valves are used which sequentially increase the speed ratio through the transmission, it is necessary to provide a plurality of such governors for each transmission, at least one providing an appreciable increase in output pressure at relatively low governor speeds and another providing an appreciable increase in output pressure at relatively high governor speeds.

It is an object of the present invention to provide an improved hydraulic governor which provides appreciable increases in output fluid pressure throughout the complete range at which the governor is driven, both at relatively low governor speeds and at relatively high governor speeds, so that the same governor may be used for a plurality of such shift valves.

Governors of this type used in the past have comprised a weight connected to and movable with a piston which connects input and discharge ports when the piston is moved outwardly under the influence of centrifugal force on the weight and on the piston, with the piston having a surface thereon subject to the pressure in the discharge port which tends to move the piston and weight in the opposite direction so as to balance the forces on the piston for every governor speed. It is an object of the present invention to provide speed responsive means for shifting the weight distribution of the movable weight and piston assembly so as to decrease in effect the weight on the heavy side of the axis of governor rotation, as the speed of the governor increases, and relatively decrease the rise in fluid output pressure of the governor at the higher governor speeds.

More particularly it is an object of the invention to provide a surface subject to the pressure in the discharge port of the governor and acting against a spring to shift a portion of the movable weight and valve assembly with respect to the rest of this assembly to reduce the unbalance of the assembly. More particularly it is an object to provide such an improved governor which has a weight on the light side of the axis of rotation which is acted on by the governor pressure that increases with the speed of rotation to move the weight outwardly so that the piston assembly is more nearly in balance, and it is another object to provide another embodiment of the invention in which the weight on a piston assembly is movable with respect to the piston proper so that the weight is drawn closer to the axis of rotation under the action of the fluid pressure in the discharge port of the governor and with an increase in speed for reducing the centrifugal effect of the piston assembly and rendering it more nearly in balance at high speeds.

The invention consists of the novel constructions, arrangements and devices to be hereinafter described and claimed for carrying out the above stated object and such other objects as will appear from the following description of certain preferred embodiments of the invention illustrated with reference to the accompanying drawings, in which:

Fig. 1 is a longitudinal sectional view of a hydraulic governor embodying the principles of the invention;

Fig. 2 is a longitudinal sectional view of a modified form of the invention; and Fig. 3 is a graph showing the increases in governor pressure of both of the embodiments of the invention and also of a well-known form of hydraulic governor for comparison purposes.

Like characters of reference designate like parts in the several views.

Referring now to Fig. 1, the illustrated hydraulic governor comprises a member 10 fixed to a shaft 11 both of which are rotatable about the center axis 12 of the shaft. The member 10 is provided with connected cylindrical cavities 13 and 14 of respectively smaller and larger diameters which extend at right angles with respect to the axis 12.

A valve piston 15 is slidably disposed within the cavities 13 and 14, and the piston comprises lands 16, 17 and 18, grooves 19 and 20 between the lands and a hollow casing portion 21 on one end having a cavity 22 therein. The lands 17 and 18 are slidably disposed within the cavity 13, and the land 16 is slidably disposed in the cavity 14.

A weight 23 is fixed to the piston 15 on the end thereof opposite the hollow casing portion 21, and a weight 24 is slidably disposed within the casing portion 21 and is acted on by a spring 25 disposed between the weight 24 and a pin 26 extending through the casing portion at its outer extremity. A port 27 is provided in the piston 15 connecting the groove 19 and the cavity 22.

The rotatable governor member 10 is provided with ports 28, 29, 30 and 31 all in communication with the cavity 13. The ports 28 and 29 are connected with a governor discharge passage 32; the port 30 is an exhaust port through which fluid may freely discharge and be exhausted; and the port 31 is connected with a passage 33 which in turn is connected to a source of fluid under pressure.

The fluid pressure source may be of any suitable construction and may comprise, for example, a pump 34 having a casing 35 with two meshing pump gears 36 and 37 therein rotatable to discharge into the passage 33 and connected with a conduit 38 to draw liquid out of a sump 39. The pump 34 may be driven from any suitable prime mover (not shown). A pressure relief valve 40 is provided for maintaining the liquid pressure within the passage 33 at a predetermined maximum, and this relief valve comprises a casing 41 having a piston 42 slidably disposed therein and acted on by a spring 43. The casing 41 is provided with an exhaust passage 44 through which excess fluid from the passage 33 may discharge when the pressure in the passage 33 is sufficient to move the piston 42 downwardly against the action of the spring 43 to vent the passage 33 with respect to the passage 44.

In operation, the hydraulic governor is rotated with the shaft 11 and provides an output pressure in the passage 32 which increases in accordance with the speed of the shaft 11 and the magnitude of which is a measure of shaft speed. This output pressure may be used in connection with any suitable pressure responsive means (not shown) which it is desired to influence in accordance with variations in the speed of the shaft 11. A liquid pressure of a predetermined maximum value exists in the passage 33 being supplied thereto from the pump 34 and regulated by the valve 40. The gears 36 and 37, on being rotated in the directions indicated, draw the liquid from the sump 39 through the conduit 38 and through the pump and discharge it into the passage 33. The piston 42 in the regulator valve 40 opens the exhaust passage 44 with respect to the passage 33, moving against the action of the spring 43, when the pressure in the passage 33 tends to rise above the predetermined maximum value, and excess fluid from the pump 34 discharges through the valve 40 and passage 44.

The governor piston assembly, comprising the piston 15, the weight 23 and the weight 24 is unbalanced about the axis of rotation 12 in the direction of the weight 23, so that the piston 15 tends to move in the direction indicated by the arrow 45 when the shaft 11 and member 10 are rotated. Such movement of the piston 15 opens the port 31 from the fluid pressure supply passage 33 to the groove 19, the port 28 and the passage 32 so as to provide fluid pressure within the latter passage. This fluid pressure is impressed on the land end 16a defining a side of the groove 19 and also on the land end 17a defining the other side of the groove 19, and since the land face 16a is larger than the land face 17a, the fluid pressure in the governor outlet passage 32 tends to move the piston 15 in the opposite direction as indicated by the arrow 46 so as to close the port 31 by means of the land 17. The result is that, for any certain speed of rotation of the shaft 11 and member 10, the centrifugal force tending to move the piston 15 outwardly in the direction of the arrow 45 just balances the force tending to move the piston 15 in the opposite direction, namely, in the direction indicated by the arrow 46, the latter force being due to the fluid pressure applied to the land end 16a, and the piston 15 is substantially in its illustrated position, just cracking the port 31 by means of the land 17, to maintain the pressure in the outlet passage 32 constant, assuming that there is some slight leakage from this latter passage due to certain slightly loose fluid connections (not shown). The pressure in the passage 32 is then at some certain value corresponding to the speed that the shaft 11 and the governor are rotated, and if this speed is increased, the valve piston 15 under the influence of centrifugal force on it and on the weight 23 will tend to move farther outwardly in the direction of the arrow 45 and will provide an increased pressure in the outlet passage 32 for the governor which functions, as before stated, to tend to move the piston 15 in the opposite direction indicated by the arrow 46 to close the port 31 by means of the land 17. The pressure in the outlet conduit 32 for the governor thus increases with the speed of the governor and the shaft 11, and there is some certain pressure in the conduit 32 for every speed of rotation of the shaft 11 and governor.

Assuming that the weight 24 were held immovable in its illustrated position within the cavity 22 in the casing portion 21 by any means (not shown), the governor would correspond substantially to governors of this type now in use and the output pressure in the passage 32 would increase substantially as shown by parabolic curves No. 1 or No. 2 in Fig. 3, depending on the size of the weight 23 and other dimensions of the piston assembly. Certain values of governor speed and governor output pressure are shown in this figure for these two curves as well as for other curves hereinafter to be mentioned; however, it will be understood that these values are merely illustrative and are not intended to in any way limit the invention. If the weight 23 is relatively large and heavy, curve No. 1 would indicate the pressure output of the governor, while if the weight is relatively small, curve No. 2 would indicate the governor output pressure. It will be noted that curve No. 1 shows a substantial variation in governor output pressure at relatively low governor speeds and the coresponding governor would thus be useful for actuating a transmission shift valve at the low governor speeds. The curve reaches its maximum value, however, short of the higher governor speeds and is not useful for actuating a transmission shift valve desired to operate at higher governor speeds. Curve No. 2 extends to higher governor speeds and is useful for actuating a high speed transmission shift valve, but, as will be noted, this curve is relatively flat and unchanging at low governor speeds and is thus not suitable for actuating a low speed transmission shift valve. It will thus be apparent that both the ordinary type of governor producing curve No. 1 as well as that producing curve No. 2 would be needed to actuate two such valves. My improved governors, however, produce output pressures that vary substantially at both low and high governor speeds, as will be described, and only one governor of my improved design would be needed for two such valves.

The groove 20 and ports 29 and 30 are provided for the purpose of venting and exhausting the outlet conduit 32 for the governor on a decrease in speed of the governor, assuming that the leakage in the conduit 32 and associated connections is not sufficient for decreasing the pressure in the conduit 32 to correspond with a decreased governor speed. On a decrease in speed under these conditions, the pressure in the conduit 32 applied to the land end 16a provides a force relatively great to overbalance that due to centrifugal force on the weight 22 and piston 15 tending to move it in the direction of the arrow 45, so that the piston 15 moves in the direction of the arrow 46 and connects the ports 29 and 30 by means of the groove 20 and vents the passage 32. This venting continues until the pressure in the conduit 32 decreases to a value to correspond to the particular decreased speed of the governor existing at the time, whereupon the piston 15 moves outwardly in the direction of the arrow 45 so as to close the port 29 by means of the land 17.

With the illustrated arrangement of the weight 24 within the hollow casing portion 21 of the piston 15, the weight 24 remains in its illustrated position for a predetermined increase in speed of rotation of the shaft 11 and the governor. The pressure in the outlet passage 32 of the governor is impressed on the piston end 24a through the port 27 in the land 16, and when this pressure increases sufficiently, the force due to it added to the centrifugal force on the piston 24, the centrifugal force being due to the fact that the piston 24 is located off the axis of rotation 12 on the opposite side from the weight 23, cause the weight 24 to move outwardly within the cavity 21 against the action of the spring 25 into contact with the pin 26. This is a full snap movement of the weight 24 since once movement of the weight 24 is started, its radius of rotation with respect to the axis 12 and the centrifugal force acting on it progressively become greater. The weight 24 when resting against the pin 26 is at a considerably greater radius of rotation with respect to the axis 12 than before and tends to balance the weight 23 to a greater extent whereby the centrifugal effect on the piston 15 tending to move the piston in the direction of the arrow 45 is less and the output pressure in the conduit 32 is less than would otherwise be the case with the weight 24 in its illustrated position.

Curve No. 3 in Fig. 3 graphically illustrates the output pressure of a governor of the type shown in Fig. 1 including the weight 24 which is free to move outwardly at a predetermined speed. The output pressure of the governor in passage 32 increases on the portion of the curve between the points 47 and 48 prior to movement of the weight 24 outwardly, and the output pressure of the governor suddenly decreases between the points 48 and 49 when the weight 24 moves into contact with the pin 26. The output pressure of the governor increases from the point 49 to its upper limit for further increases in speed of the governor. This governor construction thus provides a substantial increase in fluid pressure output of the governor at low governor speeds until the output pressure reaches the value indicated by the reference numeral 48, and beyond this point the governor provides substantial increases in fluid pressure output, also, as is apparent from the graph. In view of the fact that the centrifugal force on the weight 24 is considerably greater when the weight is moved against the pin 26 as compared with the position of the weight as illustrated in Fig. 1, even though the speed of the governor were reduced slightly below the speed at which the weight 24 moves outwardly, this slight decrease is not sufficient to cause the weight 24 to move back into its illustrated position under the action of the spring 25, but some considerably lower governor speed must be reached before the weight 24 moves back. A hunting action of the weight 24 and corresponding changes in output pressure of the governor are thus avoided.

The governor illustrated in Fig. 2, constituting a modification of the invention, comprises a member 60 fixed with respect to a shaft 61 both of which are rotatable about an axis 62. The member 60 is provided with connected cylindrical cavities 63 and 64 which lie at right angles with respect to the axis of rotation 62 and are respectively of relatively small and large diameters.

A piston 65 is slidably disposed within the cavities 63 and 64 and has lands 66 and 67 respectively within the cavities 63 and 64 and a groove 68 between the lands 66 and 67. The piston 65 is hollow and is provided with central cylindrical cavities 69 and 70 extending therethrough. The cavity 70 is connected with the groove 68 by means of an opening 71 through the piston 65.

A weight assembly 72 is provided for moving the piston 65 under the influence of centrifugal force. The weight assembly comprises a weight 73 connected by means of a rod 74 with another smaller weight 75. The rod 74 extends through the piston 65 in contact with the sides of the cavity 69 and comprises a land 76 which is in contact with the sides of the cavity 70.

The rotatable member 60 is provided with ports 77, 78 and 79. The port 77 is connected with a passage 80 carrying fluid under pressure from any suitable source, such as, for example, from the same source as is illustrated in Fig. 1 comprising the pump 34. The port 78 is connected with an output passage 81, and the port 79 is also connected with this passage 81 by means of a passage 82. The weight assembly 72 is slidable within the piston 65, and a compression spring 83 is provided between the weight 73 and the piston 65 for yieldably holding the piston 65 in contact with the weight 75.

The weight 73 is greater than the weight 75 as has been mentioned, and the weight 73 is initially located farther from the center of rotation 62 than the weight 75 substantially as illustrated in Fig. 2. The weight assembly 72 and the piston 65 on rotation of the member 60 and shaft 61 therefore tend to move in the direction of the weight 73 from the axis of rotation 62, namely, in the direction indicated by the arrow 84 so as to meter fluid between edges of the port 77 and groove 68 to provide fluid under pressure to the port 78 and passage 81. The fluid in the passage 81 is regulated and increases with the speed of rotation and the centrifugal effect on the weight assembly 72. The fluid pressure in the passage 81 is applied to the land face 67a and produces a force tending to move the piston 65 in the direction of the arrow 85 so as to balance the centrifugal force on the weight assembly tending to move the piston 65 in the opposite direction, and these two forces balance for every speed of the shaft 61 similar to the action in the Fig. 1 governor described above.

The fluid pressure in the passage 81 is impressed on the land face 76a through the opening 71 in the piston 65 and tends to move the weight assembly 72 in the direction indicated by the arrow 85 with respect to the piston 65 against the action of the spring 83, and such movement of the weight assembly takes place in increasing degree as the pressure within the passage 81 increases. By this movement of the weight assembly, the larger weight 73 is moved closer to the axis of rotation 62, and the smaller weight 75 is moved farther from the axis of rotation 62 so as to decrease the centrifugal effect of the weight assembly tending to move the piston 65 in the direction of the arrow 84. The pressure in the outlet passage 81 of the governor is thus less than would be the case if there were no shifting of the weight assembly with respect to the piston 65, and the construction provides substantial increases in governor pressures over a range which is greatly extended with respect to that of a simple governor in which there is no lessening of the centrifugal effect with increases in governor output pressure.

Referring to Fig. 3, the output pressure of the Fig. 2 governor is shown by curve No. 4, and, as is apparent, the governor output pressure increases gradually throughout the complete range of governor speeds, similar to the increases in output provided by the Fig. 1 governor but without the sudden drop between the points 48 and 49. The shifting of the weight assembly 72 in the Fig. 2 governor with respect to the piston 65 is gradual rather than abrupt since the two weights 73 and 75 on opposite sides of the axis of rotation are connected to move together.

The port 79 and passage 82 connected with the output passage 81 of the Fig. 2 governor are provided for the purpose of draining the passage 81 through the open end of the cavity 63 on a movement of the piston 65 in the direction of the arrow 85 on a sudden decrease in speed, the port 79 and passage 82 in this embodiment of the governor functioning similar to the port 29 in the Fig. 1 embodiment connected to the output passage 32.

As illustrated by the Fig. 3 graph, my improved governors advantageously provide output pressures that vary substantially through an extended range, both at high governor speeds as well as at low governor speeds. Therefore only a single one of my improved type of governor may be used for actuating, for example, a plurality of pressure actuated shift valves in a hydraulic transmission in lieu of a plurality of ordinary governors which provide substantial variations in output pressure at either low governor speeds or high governor speeds but not at both low and high speeds.

I wish it to be understood that my invention is not to be limited to the specific constructions and arrangements shown and described except only insofar as the claims may be so limited, as it will be apparent to those skilled in the art that changes may be made without departing from the principles of the invention.

I claim:

1. In a hydraulic governor, the combination of a member rotatable about an axis, a valve piston assembly slidably disposed in said rotatable member and unbalanced to one side of said axis whereby the piston assembly tends to move outwardly by centrifugal force to this side of the axis when said member is rotated, said member having a fluid supply port and a fluid discharge port in communication with said piston assembly and connected by the piston assembly when the piston assembly is moved outwardly by centrifugal force, said piston assembly having a surface thereon in communication with the discharge port whereby fluid therein tends to move the piston assembly in the opposite direction and to close said ports with respect to each other and balance said centrifugal force so that the fluid pressure in said discharge port rises with increases in speed of said member, and speed responsive means for decreasing the centrifugal effect on said piston assembly tending to move it to said one side of said axis for decreasing the rise of fluid pressure in said discharge port with increases in speed of said member.

2. In a hydraulic governor, the combination of a member rotatable about an axis and a valve piston assembly slidably disposed in said rotatable member, said piston assembly including a weight and being unbalanced to one side of said axis whereby the piston assembly tends to move outwardly by centrifugal force to this side of the axis when said member is rotated, said member having a fluid supply port and a fluid discharge port in communication with said piston assembly and connected by the piston assembly when the piston assembly is moved outwardly by centrifugal force, said piston assembly having a surface thereon in communication with the discharge port whereby fluid therein tends to move the piston assembly in the opposite direction and to close said ports with respect to each other and balance said centrifugal force so that the fluid pressure in said discharge port rises with increases in speed of said member, said weight being movable with respect to the rest of said piston assembly with increases in speed of said member to decrease the unbalance of said assembly for decreasing the rise of fluid pressure in said discharge port with increases in speed of said member.

3. In a hydraulic governor, the combination of a member rotatable about an axis, a valve piston assembly slidably disposed in said rotatable member, said piston assembly including a weight and being unbalanced to one side of said axis whereby the piston assembly tends to move outwardly by centrifugal force to this side of the axis when said member is rotated, said member having a fluid supply port and a fluid discharge port in communication with said piston assembly and connected by the piston assembly when the piston assembly is moved outwardly by centrifugal force, said piston assembly having a surface thereon in communication with said discharge port whereby fluid therein tends to move the piston assembly in the opposite direction and to close said ports with respect to each other and balance said centrifugal force so that the fluid pressure in said discharge port rises with increases in speed of said member, said weight being movable with respect to the rest of said piston assembly and being under the influence of the speed of rotation of said member to move and decrease the unbalance of said assembly for decreasing the rise of fluid pressure in said discharge port with increases in speed of said member, and a spring for yieldably opposing such movement of said weight.

4. In a hydraulic governor, the combination of a member rotatable about an axis and a valve piston assembly comprising a piston slidably disposed in said rotatable member and a weight movable with respect to said piston, said piston assembly being unbalanced to one side of said axis whereby the assembly tends to move outwardly by centrifugal force to this side of the axis when said member is rotated, said member having a fluid supply port and a fluid discharge port in communication with said piston and connected by the piston when the piston is moved outwardly by centrifugal force, said piston having a surface thereon in communication with said discharge port whereby fluid therein tends to move the piston in the opposite direction and to close said ports with respect to each other and balance said centrifugal force so that the fluid pressure in said discharge port rises with increases in speed of said member, said weight having a surface in communication with said discharge port so as to shift the weight under the influence of the increasing pressure in said discharge port for decreasing the unbalance of said piston assembly tending to move it to said one side of said axis for decreasing the rise of fluid pressure in said discharge port with increases in speed of said member.

5. In a hydraulic governor, the combination of a member rotatable about an axis, a valve piston assembly comprising a piston and a weight movable relative to the piston, said piston being slidably disposed in said rotatable member and the piston assembly being unbalanced to one side of said axis whereby the piston tends to move outwardly under the action of centrifugal force to this side of the axis when said member is rotated, said member having a fluid supply port and a fluid discharge port in communication with said piston and connected by the piston when the piston is moved outwardly under the action of the centrifugal force, said piston having a surface thereon in communication with the discharge port whereby fluid therein tends to move the piston in the opposite direction to close said ports with respect to each other and balance said centrifugal force so that the fluid pressure in said discharge port rises with increases in speed of said member, said weight having a surface thereon in communication with said discharge port whereby the weight is moved relative to said piston under the influence of the pressure in the discharge port to decrease the unbalance of said piston assembly for decreasing the rise of fluid pressure in said discharge port with increases in speed of said member, and a spring for yieldably acting against said weight in its said movement.

6. In a hydraulic governor, the combination of a member rotatable about an axis, a valve piston assembly comprising a piston, a large weight on one end of the piston and a smaller weight on the opposite end of the piston, said smaller weight being movable with respect to said piston, said piston being slidably disposed in said rotatable member and movable under the action of centrifugal force by said larger weight to one side of said axis when said member is rotated, said member having a fluid supply port and a fluid discharge port in communication with said piston and connected by the piston when the piston is moved outwardly by centrifugal force on said large weight, said piston having a surface thereon in communication with said discharge port whereby fluid pressure therein tends to move the piston in the opposite direction to close said ports with respect to each other and balance said centrifugal force so that the fluid pressure in said discharge port rises with increases in speed of said member, said smaller weight having a surface subject to the pressure of fluid in said discharge port whereby the weight is moved outwardly with respect to said axis as the governor discharge pressure increases for decreasing the centrifugal effect of said piston assembly for decreasing the rise of fluid pressure in said discharge port with increases in speed of said member.

7. In a hydraulic governor, the combination of a member rotatable about an axis, a valve piston assembly comprising a piston movable within said member, a weight fixed to said piston on one side of said axis and a weight movable relative to said piston and disposed on the other side of said axis, said first named weight unbalancing the piston assembly whereby the piston tends to move outwardly by centrifugal force to the side of this weight when said member is rotated, said member having a fluid supply port and a fluid discharge port in communication with said piston and connected by the piston when the piston is moved outwardly by centrifugal force, said piston having a surface thereon in communication with said discharge port whereby fluid therein tends to move the piston in the opposite direction and to close said ports with respect to each other and balance said centrifugal force so that the fluid pressure in said discharge port rises with increases in speed of said member, said second named weight being influenced by centrifugal force so that it moves outwardly from the axis of rotation of said member on a predetermined speed of the member so as to partially balance said first named weight for decreasing the rise of fluid pressure in said discharge port with increases in speed of said member, and a spring for yieldably holding said second named weight from such movement away from the axis of rotation of said member.

8. In a hydraulic governor, the combination of a member rotatable about an axis, a valve piston assembly comprising a piston slidably disposed in said rotatable member, a weight fixed to said piston on one side of said axis and a weight carried by and movably disposed with respect to said piston on the other side of said axis, said first named weight unbalancing said assembly to the side of this weight whereby the assembly tends to move outwardly to this side by centrifugal force when said member is rotated, said member having a fluid supply port and a fluid discharge port in communication with said piston and connected by the piston when the piston is moved outwardly by centrifugal force, said piston having a surface thereon in communication with said discharge port whereby fluid therein tends to move the piston in the opposite direction to close said ports with respect to each other and balance said centrifugal force so that the fluid pressure in said discharge port rises with increases in speed of said member, said second named weight having a surface in communication with said discharge port providing a force on the weight augmenting centrifugal force thereon tending to move the weight outwardly from said axis of rotation for decreasing the centrifugal effect of said piston assembly due to said first named weight and decreasing the rise of fluid pressure in said discharge port with increases in speed of said member, a spring yieldably holding said second named weight from movement outwardly from said axis of rotation, and a stop for limiting the outward movement of said second named weight with respect to said piston.

9. In a hydraulic governor, the combination of a member rotatable about an axis and a valve piston assembly comprising a piston slidably disposed in said rotatable member and a weight carried by said piston and disposed on one side of said axis tending to move the piston outwardly to this side of the axis by centrifugal force when said member is rotated, said member having a fluid supply port and a fluid discharge port in communication with said piston and connected by the piston when the piston is moved outwardly by centrifugal force, said piston having a surface thereon in communication with said discharge port whereby fluid pressure therein tends to move the piston in the opposite direction to close said ports with respect to each other and balance said centrifugal force so that the fluid pressure in said discharge port rises with increases in speed of said member, said weight being movable with respect to said piston and having a surface in communication with said discharge port tending to move the weight inwardly towards said axis under the action of fluid pressure in the discharge port for decreasing the centrifugal force on the weight and piston assembly and decreasing the rise of fluid pressure in said discharge port with increases in speed of said member.

10. In a hydraulic governor, the combination of a member rotatable about an axis, a valve piston assembly comprising a piston slidably disposed in said rotatable member and a weight on one side of said axis and connected with said piston and tending to move the piston outwardly by centrifugal force to this side of the axis when said member is rotated, said member having a fluid supply port and a fluid discharge port in communication with said piston and connected by the piston when the piston is moved outwardly by centrifugal force, said piston having a surface thereon in communication with the discharge port whereby fluid therein tends to move the piston in the opposite direction to close said ports with respect to each other and balance said centrifugal force so that the fluid pressure in said discharge port rises with increases in speed of said member, said weight being movable inwardly of said axis and with respect to said valve piston and having a surface thereon in communication with said discharge port so that the pressure therein tends to move the weight inwardly and thereby decrease the centrifugal force effective to move the valve piston outwardly and decrease the rise of fluid pressure in said discharge port with increases in speed of said member, and a spring for yieldably holding said weight against inward movement due to the fluid pressure in said discharge port.

11. In a hydraulic governor, the combination of a member rotatable about an axis, a valve piston assembly comprising a piston slidably disposed in said rotatable member, a weight on one side of said axis, a weight on the other side of said axis and a rod extending through said piston and connecting said weights, one of said weights providing a greater centrifugal force than the other weight and tending to move said piston outwardly by centrifugal force to one side of the axis when said member is rotated, said member having a fluid supply port and a fluid discharge port in communication with said piston and connected by the piston when the piston is moved outwardly by centrifugal force, said piston having a surface thereon in communication with said discharge port whereby fluid therein tends to move the piston in the opposite direction to close said ports with respect to each other and balance said centrifugal force so that the fluid pressure in said discharge port rises with increases in speed of said member, said rod being movable through said valve piston and having a surface in communication with said discharge port whereby fluid in this port tends to move the rod through said piston to move one of said weights towards said axis and the other weight away from said axis to decrease the centrifugal force from said weights tending to move said valve piston in a direction to open said ports with respect to each other, and a spring effectively between one of said weights and said piston tending to oppose said movement of said rod with respect to said piston under the influence of the fluid pressure from said discharge port.

12. In a hydraulic governor, the combination of a member rotatable about an axis, a valve piston assembly including relatively movable portions and slidably disposed in said rotatable member for radial movement with respect to said axis with the center of mass of the piston assembly located to one side of said axis whereby the piston assembly tends to move outwardly by centrifugal force to this side of the axis when said member is rotated, said member having a fluid supply port and a fluid discharge port with said ports arranged for communication, said piston having a portion adapted for restricting communication between said ports and arranged so that communication is progressively less restricted when the piston assembly is moved outwardly by centrifugal force, said piston assembly having a surface thereon in communication with the discharge port and having said surface disposed with respect to said axis so that fluid in the discharge port tends to move the piston assembly in the opposite direction to close said ports with respect to each other and balance said centrifugal force so that the fluid pressure in said discharge port rises with increases in speed of said member, and speed responsive means including said relatively movable portions of said piston assembly for decreasing the centrifugal effect on said piston assembly tending to move it to said one side of said axis for decreasing the rise of fluid pressure in said discharge port with increases in speed of said member.

13. A governor for controlling the rate of change of fluid pressure comprising a member rotatable about an axis, a valve assembly radially slidably disposed in said member with respect to said axis with the center of mass of the valve assembly located eccentrically of the axis so that the valve assembly is movable outwardly in response to centrifugal force changes generated by rotation of said member, means introducing fluid under pressure against a portion of said valve assembly when the valve assembly is moved outwardly whereby the fluid pressure biases the valve assembly inwardly, said valve assembly including two relatively movable parts, and means applying the biasing fluid pressure on opposing portions of said two valve parts to urge the same in a direction for shifting the center of the mass of the valve assembly closer to said member axis whereby the biasing fluid pressure varies at a slower rate in response to changes in speed of rotation of said member.

14. A centrifugal type fluid pressure governor comprising a valve assembly including a member rotatable about an axis and two valve parts radially slidably disposed in said member with respect to said axis with the center of mass of the valve parts being located eccentrically of the axis so that the valve parts tend to move outwardly of the axis under centrifugal force when said member is rotated, means for supplying fluid under pressure to said valve parts, one of said valve parts including metering means for metering fluid pressure from said supply which changes in response to increased centrifugal force, means directing the fluid pressure metered by said one valve part against a portion of the other valve part to cause relative movement between the valve parts whereby the center of mass of the valve assembly is shifted nearer said axis to decrease centrifugal force on the valve assembly.

15. A centrifugal type governor adapted to control a fluid output force comprising a member rotatable about an axis, two relatively movable control parts at opposite sides of said axis arranged for rotation with said member and radially movably disposed with respect to the member whereby the parts tend to move radially outwardly in opposite directions under centrifugal force when the member is rotated, a valve including a valve member, means to effect movement of said valve member in response to centrifugal force on at least one of said parts, one of said parts providing an output force which varies in accordance with changes in centrifugal force on said one part, and means for imposing said output force against the other of said parts for changing the centrifugal response of said last named part.

16. A centrifugal fluid pressure governor adapted for use with a source of fluid pressure comprising a rotatable member adapted to be rotated about an axis, a movable valve member in said rotatable member constructed and arranged to meter fluid; and an assembly adapted to control the movement of said movable valve member comprising a pair of weights, means mounting said weights on opposite sides of said rotatable member in substantially radial alignment, and means to effect movement of one of said weights relative to the other of said weights at a predetermined speed of rotation of said rotatable member whereby the effect of said assembly on said valve member is modified.

17. The device defined in claim 16 in which means are provided to bias said one of said weights toward said axis, and in which said one of said weights is adapted to move outwardly a predetermined amount against the action of said biasing means.

18. A centrifugal fluid pressure governor adapted for use with a source of fluid pressure comprising a rotatable member adapted to be rotated about an axis, a movable valve member in said rotatable member adapted to meter fluid; and an assembly adapted to control the movement of said movable valve member comprising a primary weight and a secondary weight of lesser weight than said primary weight, means mounting said weights on opposite sides of said rotatable member in substantially radial alignment, and means to effect movement of one of said weights relative to the other of said weights at a predetermined speed of rotation of said rotatable member whereby the effect of said assembly on said valve member is modified.

19. A centrifugal fluid pressure governor adapted for use with a source of fluid pressure comprising a rotatable member adapted for rotation about an axis, a movable valve member in said rotatable member; and an assembly adapted to control the movement of said movable valve member comprising a pair of weights, means mounting said weights on opposite sides of said rotatable member for rotation as a unit with said member below a predetermined speed of rotation of said member, and means for effecting relative movement between said weights at a predetermined speed of rotation of said member to vary the effect of said assembly on said movable valve member.

20. In a hydraulic governor, the combination comprising a governor body rotatable about an axis, a valve assembly including relatively movable weight portions slidably disposed in said governor body on opposite sides thereof for radial movement in opposite directions with respect to said axis with the center of mass of said valve assembly located at one side of the axis whereby said valve assembly tends to move toward this one side of the axis under the influence of centrifugal force when said governor body is rotated, means defining a fluid supply port in said governor body, means defining a fluid discharge port in said governor body arranged for communication with said fluid supply port, means on said valve assembly adapted to restrict communication between said ports and arranged so that communication is progressively less restricted as the valve assembly is moved toward the one side of the axis under the influence of centrifugal force, means on said valve assembly defining a surface thereon in communication with one of said ports disposed with respect to said axis so that fluid tends to move said valve assembly in a direction to restrict communication between said ports, and speed responsive means including said relatively movable weight portions of said valve assembly and stop means adapted to limit movement of at least one of said weight portions constructed and arranged to decrease the rate of increase of fluid pressure in said discharge port with increases in rotative speed of said governor body above a predetermined speed of rotation.

21. In a hydraulic governor, the combination comprising a governor body rotatable about an axis, means defining a fluid supply port and a fluid discharge port in said governor body, means defining an opening in said governor body adapted to effect fluid communication between said supply and discharge ports, a valve including a valve portion slidably disposed in said opening, means on said valve portion adapted to restrict communication between said ports and arranged so that communication between said ports is progressively less restricted as said valve portion is moved in one direction toward one side of the axis, means on said valve defining a surface thereon in communication with said discharge port disposed so that fluid tends to move said valve in the opposite direction to restrict communication between said ports; and centrifugal weight means adapted and arranged to effect movement of said valve toward said one side of the axis comprising a first centrifugal weight portion on one side of the axis, a second centrifugal weight portion on the other side of the axis movable under the influence of centrifugal force with respect to said first centrifugal weight portion, and stop means to limit the extent of movement of said second centrifugal weight portion as it moves under the influence of centrifugal force.

22. A centrifugal fluid pressure governor adapted for use with a source of fluid pressure comprising a rotatable member adapted to be rotated about an axis; a movable valve member adapted to meter fluid; and a centrifugal weight assembly constructed and arranged to control movement of said valve member comprising a first weight on one side of the axis, a second weight on the opposite side of said axis movable relative to said first weight in response to centrifugal force, and stop means limiting the degree of movement of said second weight relative to said first weight as said second weight is moved in response to centrifugal force.

23. A centrifugal fluid pressure governor adapted for use with a source of fluid pressure comprising a rotatable member adapted to be rotated about an axis; a movable valve member adapted to meter fluid; and a centrifugal weight assembly constructed and arranged to control movement of said valve member comprising a first weight on one side of said axis, a second weight on the opposite side of said axis movable relative to said first weight in response to centrifugal force, stop means limiting the degree of movement of said second weight relative to said first weight as said second weight is moved in response to centrifugal force, and spring means biasing said second weight against said centrifugal force responsive movement.

24. In a multistage centrifugally responsive hydraulic governor mechanism adapted to produce a relatively rapid increase in output hydraulic pressure as the rotative speed thereof increases through an initial range of r.p.m. and to produce a relatively less rapid increase in output hydraulic pressure as the rotative speed thereof increases beyond said initial range of r.p.m., the combination comprising a rotatable member adapted to be rotated about an axis, a movable valve member adapted to meter fluid, and centrifugally responsive weight means constructed and arranged to control movement of said movable valve member to vary the governor output pressure comprising a first weight adjacent one end of the valve member movable away from said axis in response to centrifugal force, a second weight adjacent the opposite end of the valve member movable away from said axis in response to centrifugal force, and means mounting said first and second weights for relative movement therebetween whereby the effect of said centrifugally responsive weight means on said valve changes as said weights move relatively.

25. In a multistage centrifugally responsive hydraulic governor mechanism adapted to produce a relatively rapid increase in output hydraulic pressure as the rotative speed thereof increases through an initial range of r.p.m. and to produce a relatively less rapid increase in output hydraulic pressure as the rotative speed thereof increases beyond said initial range of r.p.m., the combination comprising a rotatable member adapted to be rotated about an axis, a movable valve member adapted to meter fluid, and centrifugally responsive weight means constructed and arranged to control movement of said movable valve member to vary the governor output pressure comprising a first weight adjacent one end of said valve member movable away from said axis in response to centrifugal force, a second weight adjacent the opposite end of said valve member movable away from said axis in response to centrifugal force, and means mounting said first and second weights for movement thereof relative to said valve member whereby the effect of said centrifugal responsive weight means on said valve changes as said weights move relative thereto.

26. In a multistage centrifugally responsive hydraulic governor mechanism adapted to produce a relatively rapid increase in output hydraulic pressure as the rotative speed thereof increases through an initial range of r.p.m. and to produce a relatively less rapid increase in output hydraulic pressure as the rotative speed thereof increases beyond said initial range of r.p.m., the combination comprising a rotatable member adapted to be rotated about an axis, a movable valve member adapted to meter fluid, and centrifugally responsive weight means constructed and arranged to control movement of said movable valve member to vary the governor output pressure comprising a first weight adjacent one end of said valve member movable away from said axis in response to centrifugal force, a second weight adjacent the opposite end of said valve member movable away from said axis in response to centrifugal force, means mounting said first and second weights for rotation as a unit below a predetermined rotative speed of said governor mechanism, and means effecting relative movement between said first and second weight means upon a predetermined speed of rotative movement of said governor mechanism whereby the effect of said centrifugally responsive weight means on said valve changes as the rotative speed of said governor mechanism increases upon the predetermined rotative speed.

27. In a device for modulating the pressure of fluid derived from a source of fluid under pressure including a rotatable centrifugal mechanism capable of moving radially with respect to its rotational axis to various radial positions; pulsator means for the reception of the pressure modulated fluid, said pulsator means being operable responsively to fluid pressure to urge said mechanism radially toward said rotational axis; control valve means interposed between said source of fluid pressure and said pulsator means, said valve means being operable under control of said mechanism to open responsively to radial departure of said mechanism a predetermined distance from said rotational axis whereby fluid is admitted into said pulsator means, said pulsator means being operable upon the attainment of a predetermined pressure of fluid admitted thereto to prevail over the centrifugal force of said mechanism to urge said mechanism radially toward said rotational axis to close said valve means.

28. The device as set forth in claim 27, in which said mechanism includes a relatively movable part, said part being movable in a diection to develop a centrifugal force tending to close said valve means upon the attainment of a predetermined rotational speed of said mechanism.

29. The device as set forth in claim 27, in which said mechanism includes a primary part and a secondary part, said secondary part being slidably supported by and relatively movable to said primary part to develop a centrifugal force in opposition to the centrifugal force developed by said primary part upon the attainment of a predetermined rotational speed of said mechanism.

30. In a device for modulating the pressure of fluid derived from a source of fluid under pressure including a rotatable centrifugal mechanism capable of moving with respect to its rotational axis to various positions; pulsator means for the reception of the pressure modulated fluid, said pulsator means being operable responsively to fluid pressure to urge said mechanism radially toward said rotational axis; first control valve means interposed between said source of fluid pressure and said pulsator means, said valve means being operable under control of said mechanism to open in response to a predetermined positioning of said mechanism whereby fluid is admitted into said pulsator means; and a second control valve means interposed between said pulsator means and the atmosphere, said second valve means being operable under control of said mechanism to open in response to a second predetermined positioning of said mechanism whereby fluid is emitted from said pulsator means to the atmosphere.

31. The device as set forth in claim 30, in which said mechanism includes a relatively movable part, said part being movable in a direction to develop a centrifugal force tending to move said mechanism to the position corresponding to the valve-closed condition of said first valve means and the valve-open condition of said second valve means upon the attainment of a predetermined rotational speed of said mechanism.

32. The device as set forth in claim 30, in which said pulsator means is operable upon the attainment of a predetermined pressure of fluid admitted thereto to prevail over the centrifugal force of said mechanism acting radially of said rotational axis to close said first valve means and open said second valve means.

33. In a device for modulating the pressure of fluid derived from a source of fluid under substantially constant pressure; a primary centrifugal weight; a secondary centrifugal weight, means confining said weights for relative movement along a line intersecting their respective centers of mass; means rotating said weights about an axis intersecting said line of relative movement at a point between the center of mass of said secondary weight and the center of mass of said primary weight; stop means limiting the approach of said centers of mass of said weights toward one another; means yieldably urging said weights together to said approach limit; pulsator means operable responsively to fluid pressure to urge the primary weight radially toward said rotational axis; and control valve means interposed between said source of fluid pressure and said pulsator means, said valve means being operable under control of said weights to open responsively to radial departure of the primary weight a predetermined distance from said rotational axis whereby fluid is admitted into said pulsator means, said pulsator means being operable upon the attainment of a predetermined pressure of fluid admitted thereto to prevail over the net centrifugal force of said weights acting radially of said rotational axis to close said valve means.

34. In a device for modulating the pressure of fluid derived from a source of fluid under pressure including a rotatable centrifugal mechanism capable of moving with respect to its rotational axis to various positions, said mechanism including a first part and a second part; chamber means for the reception of the pressure modulated fluid; control valve means interposed between said source of fluid pressure and said chamber means, said valve means being operable under control of said mechanism to open in response to a predetermined positioning of said mechanism whereby fluid is admitted into said chamber means, said first part being fixed to said valve means; and regulating means for controlling the movement of said mechanism to the position corresponding to said valve open condition of said valve means including said second part of said mechanism, said second part being movable with respect to said first part, said valve means and the rotational axis of said mechanism in a direction to develop a centrifugal force tending to close said valve means upon the attainment of a predetermined rotational speed of said mechanism.

35. A device including valve means movable between two positions corresponding to a valve opened condition and a valve closed condition; control means for applying an actuating force to said valve means for conditioning said valve including a rotatable centrifugal mechanism operatively connected to said valve means for applying a force of varying magnitude for moving said valve means in one direction, said centrifugal mechanism including a first part fixed with respect to said valve means and a second part having centers of mass disposed on respective diametrically opposite sides of the rotational axis of said centrifugal mechanism, said first and second parts moving radially in unison in one direction to various positions with respect to the rotational axis of said centrifugal mechanism upon rotation of the same, said second part being movable with respect to said first part, said valve means, and the rotational axis of said mechanism in an opposite radial direction upon the attainment of a predetermined rotational speed of said centrifugal mechanism.

36. In a device for modulating the pressure of fluid derived from a source of fluid under pressure including chamber means for the reception of pressure modulated fluid; control valve means interposed between said source of fluid pressure and said chamber means, said valve means being movable to a valve opened condition whereby fluid is admitted into said chamber means; and control means for moving said valve means to establish various conditions thereof including a rotatable centrifugal mechanism operatively connected to said valve means for moving said valve means to a position corresponding to a valve opened condition including a first part fixed with respect to said valve means and a second part having centers of mass disposed on respective diametrically opposite sides of the rotational axis of said centrifugal mechanism, said first and second parts radially moving in unison in one direction to various positions with respect to the rotational axis of said centrifugal mechanism upon rotation of the same, said second part being movable with respect to said first part, said valve means, and the rotational axis of said mechanism in an opposite radial direction upon the attainment of a predetermined rotational speed of said mechanism.

References Cited in the file of this patent

UNITED STATES PATENTS

| 1,347,208 | Cockburn et al. | July 20, 1920 |
| 1,811,850 | Huff | June 30, 1931 |
| 2,155,247 | Warner | Apr. 18, 1939 |
| 2,697,363 | Sheppard | Dec. 21, 1954 |

FOREIGN PATENTS

| 351,710 | Italy | Aug. 19, 1937 |